United States Patent [19]

Digalakis et al.

[11] Patent Number: 5,825,978
[45] Date of Patent: Oct. 20, 1998

[54] METHOD AND APPARATUS FOR SPEECH RECOGNITION USING OPTIMIZED PARTIAL MIXTURE TYING OF HMM STATE FUNCTIONS

[75] Inventors: Vassilios Digalakis, Palo Alto; Hy Murveit, Portola Valley, both of Calif.

[73] Assignee: SRI International, Menlo Park, Calif.

[21] Appl. No.: 276,742

[22] Filed: Jul. 18, 1994

[51] Int. Cl.[6] .................................................. G10L 9/00
[52] U.S. Cl. ........................................ 395/2.65; 395/2.54
[58] Field of Search .............................. 395/2.53–2.54, 395/2.59, 2.64–2.65

[56] References Cited

U.S. PATENT DOCUMENTS

| | | | |
|---|---|---|---|
| 4,587,670 | 5/1986 | Levinson et al. | |
| 4,741,036 | 4/1988 | Bahl et la. | |
| 4,783,804 | 11/1988 | Juang et al. | 381/43 |
| 4,817,156 | 3/1989 | Bahl et al. | |
| 4,903,305 | 2/1990 | Gillick et al. | 381/41 |
| 5,075,896 | 12/1991 | Wilcox et al. | 382/39 |
| 5,172,228 | 12/1992 | Israelsen | 358/133 |
| 5,193,142 | 3/1993 | Zhao | 395/2 |

OTHER PUBLICATIONS

Digalakis et al., "Acoustic Calibration and Search in SRI's Large Vocabulary Recognition System," Proc. IEEE ASR Workshop, Snowbird, Dec. 1993.

Manikopoulos, "Finite State Vector Quantisation with Neural Network Classification of States," IEEE Proceedings–F, vol. 140, No. 3, Jun. 1993.

Knutson et al., "Feature Based Compression of Vector Quantized Codebooks and Data for Optimal Image Compression," Circuits and Systems, May 1993 IEEE International Symposium, May 1993.

Young, "The General Use of Tying in Phoneme–Based HMM Speech Recognisers," Proc. ICASSP, pp. I–569–I–572, Mar. 1992.

Hwang et al., "Subphonetic Modeling with Markov States—Senone," Proc. ICASSP, pp. I–33–I–36, Mar. 1992.

Lee et al., "Allophone Clustering For Continuous Speech Recognition," ICASSP '90: Acoustics, Speech & Signal Processing Conference, Feb. 1990.

Lee, "Context–Dependent Phonetic HMM For Speaker–Independent Continous Speech Recognition," IEEE Trans. ASSP, pp. 599–609, Apr. 1990.

Kubrick et al., "Classified Vector Quantisation of Images: Codebook Design Algorithm," IEE Proceedings, vol. 137, Pt. I, No. 6, Dec. 1990.

Rabiner, "A Tutorial on Hidden Markov Models and Selected Applications in Speech Recognition," *Proc. IEEE*, vol. 77, No. 2, pp. 267–296, Feb. 1989.

Gray, "Vector Quantization," *The ASSP Magazine*, vol. 1, No. 2, pp. 3–29 (Apr. 1984).

(List continued on next page.)

*Primary Examiner*—Allen R. MacDonald
*Assistant Examiner*—Susan Wieland
*Attorney, Agent, or Firm*—Townsend and Townsend and Crew LLP; Kenneth R. Allen, Esq.; Stephen J. LeBlanc, Esq.

[57] ABSTRACT

In accordance with the invention, a speech recognizer is provided which uses a computationally-feasible method for constructing a set of Hidden Markov Models (HMMs) for speech recognition that utilize a partial and optimal degree of mixture tying. With partially-tied HMMs, improved recognition accuracy of a large vocabulary word corpus as compared to systems that use fully-tied HMMs is achieved with less computational overhead than with a fully untied system. The computationally-feasible technique comprises the steps of determining a cluster of HMM states that share Gaussian components which are close together, developing a subset codebook for those clusters, and recalculating the Gaussians in the codebook to best estimate the clustered states.

17 Claims, 4 Drawing Sheets

OTHER PUBLICATIONS

L. R. Rabiner, B. H. Juang, S. E. Levinson, and M. M. Sondhi, "Recognition of Isolated Digits Using Hidden Markov Models with Continuous Mixture Densities," *Bell Systems Tech. Journal,* vol. 64(6), pp. 1211–1234, 1985.

X. D. Huang, and M. A. Jack, "Performance Comparison Between Semi–continuous and Discrete Hidden Markov Models," *IEEE Electronics Letters,* vol. 24 No. 3, pp. 149–150.

J. R. Bellegarda and D. Nahmoo, "Tied Mixture Continuous Parameter Modeling for Speech Recognition," *IEEE Trans. ASSP,* vol. 38(12), pp. 2033–2045, Dec. 1990.

C. Lee, L. Rabiner, R. Pieraccini and J. Wilpon, "Acoustic Modeling for Large Vocabulary Speech Recognition," *Computer Speech and Language,* Apr. 1990, pp. 127–165.

D. Pallett, "Results for the Sep. 1992 Resource Management Benchmark," *DARPA Workshop on Artificial Neural Networks and CSR,* Sep. 1992.

D. B. Paul and E. A. Martin, "Speaker Stress–resistant Continuous Speech Recognition," *Proc. ICASSP,* pp. 283–286, Apr. 1988.

K. F. Lee, "Context–Dependent Phonetic Hidden Markov Models for Speaker–Independent Continuous Speech Recognition," *IEEE Trans. ASSP,* pp. 599–609, Apr. 1990.

L. R. Bahl, P. V. de Souza, P. S. Gopalakrishnan, D. Nahamoo and M. A. Picheny, "Context Dependent Modeling of Phones in Continuous Speech Using Decision Trees," *DARPA Workshop on Speech and Natural Language,* pp. 264–269, Feb. 1991.

M.–Y. Hwang and X. D. Huang, "Subphonetic Modeling with Markov States—Senone," *Proc. ICASSP,* pp. I–33–36, Mar. 1992.

H. Murveit, J. Butzberger, V. Digalakis and M. Weintraub, "Large Vocabulary Dictation using SRI's Deciphertm Speech Recognition System: Progressive Search Techniques," *Proc. ICASSP,* pp. II–319–II–322, Apr. 1993.

S. J. Young, "The General Use of Tying in Phoneme–Based HMM Speech Recognizers," *Proc. ICASSP,* pp. I–569–I–572, Mar. 1992.

R. Haeb–Umbach and H. Ney, "Linear Discriminant Analysis for Improved Large Vocabulary Continuous Speech Recognition," *Proc. ICASSP,* pp. I–13–I–16, Mar. 1992.

J. L. Gauvain and C. H. Lee, "Bayesian Learning of Gaussian Mixture Densities for Hidden Markov Models," *Proc. DARPA Speech and Natural Language Workshop,* Feb. 1991.

V. Digalakis, P. Monaco and H. Murveit, "Acoustic Calibration and Search in SRI's Large Vocabulary HMM–based Speech Recognition System," *Proc. IEEE ASR Workshop,* Snowbird, Dec. 1993.

K. F. Lee and H. W. Hon, "Speaker Independent Phone Recognition Using Hidden Markov Models," *IEEE Trans. ASSP,* pp. 1641–1648, 1989.

D. Pallet, J. G. Fiscus, W. M. Fisher, and J, S. Garofolo, "Benchmark Tests for the DARPA Spoken Language Program," *HLT Workshop,* Princeton, Mar. 1993.

METHOD AND APPARATUS FOR SPEECH RECOGNITION USING OPTIMIZED PARTIAL MIXTURE TYING OF HMM STATE FUNCTIONS

This invention was supported in part by a grant from the Office of Naval Research, Contract N00014-92-C-0154, and in part by SRI International of Menlo Park, California. The Government has certain rights in this material.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to speech recognition by computers, and more particularly to a method for recognizing speech from a large vocabulary using partially-tied Gaussian mixtures for Hidden Markov Model (HMM) state recognition.

This art presumes a basic familiarity with statistics and Markov processes, as well as familiarity with the state of the art in speech recognition systems using Hidden Markov Models. By way of example of the state of the art, reference is made to the following patents and publications, which have come to the attention of the inventors in connection with the present invention. Not all of these references may be deemed to be relevant prior art.

| Inventor | U.S. Pat. No. | Issue Date |
| --- | --- | --- |
| Bahl et al. | 4,817,156 | 03/28/89 |
| Levinson et al. | 4,587,670 | 05/06/86 |
| Juang et al. | 4,783,804 | 11/08/88 |
| Bahl et al. | 4,741,036 | 04/26/88 |

Papers

Rabiner, "A Tutorial on Hidden Markov Models and Selected Applications in Speech Recognition," *Proc. IEEE*, Vol. 77, No. 2, Feb. 1989.

Gray, "Vector Quantization," *The ASSP Magazine*, Vol. 1, No. 2, pp. 3–29 (April 1984).

L. R. Rabiner, B. H. Juang, S. E. Levinson, and M. M. Sondhi, "Recognition of Isolated Digits Using Hidden Markov Models with Continuous Mixture Densities," *Bell Systems Tech. Journal*, Vol. 64(6), pp. 1211–34, 1985.

X. D. Huang, and M. A. Jack, "Performance Comparison Between Semi-continuous and Discrete Hidden Markov Models," *IEEE Electronics Letters*, Vol. 24 no. 3, pp. 149–150.

J. R. Bellegarda and D. Nahamoo, "Tied Mixture Continuous Parameter Modeling for Speech Recognition," *IEEE Trans. ASSP*, Vol. 38(12), pp. 2033–2045, Dec. 1990.

C. Lee, L. Rabiner, R. Pieraccini and J. Wilpon, "Acoustic Modeling for Large Vocabulary Speech Recognition," *Computer Speech and Language*, April. 1990, pp. 127–165.

D. Pallett, "Results for the Sept. 1992 Resource Management Benchmark," *DARPA Workshop on Artificial Neural Networks and CSR*, Sept. 1992.

D. B. Paul and E. A. Martin, "Speaker Stress-resistant Continuous Speech Recognition," *Proc. ICASSP*, pp. 283–286, April 1988.

K. F. Lee, "Context-Dependent Phonetic Hidden Markov Models for Speaker-Independent Continuous Speech Recognition," *IEEE Trans. ASSP*, pp. 599–609, April 1990.

L. R. Bahl, P. V. de Souza, P. S. Gopalakrishnan, D. Nahamoo and M. A. Picheny, "Context Dependent Modeling of Phones in Continuous Speech Using Decision Trees," *DARPA Workshop on Speech and Natural Language*, pp.264–269, February 1991.

M. -Y. Hwang and X. D. Huang, "Subphonetic Modeling with Markov States — Senone," *Proc. ICASSP*, pp. I-33–36, March 1992.

H. Murveit, J. Butzberger, V. Digalakis and M. Weintraub, "Large Vocabulary Dictation using SRI's DECIPHERTM Speech Recognition System: Progressive Search Techniques," *Proc. ICASSP*, pp. II-319–II-322, April 1993.

S. J. Young, "The General Use of Tying in Phoneme-Based HMM Speech Recognizers," *Proc. ICASSP*, pp. I-569–I-572, March 1992.

R. Haeb-Umbach and H. Ney, "Linear Discriminant Analysis for Improved Large Vocabulary Continuous Speech Recognition," *Proc. ICASSP*, pp. I-13–I-16, March 1992.

J. L. Gauvain and C. H. Lee, "Bayesian Learning of Gaussian Mixture Densities for Hidden Markov Models," *Proc. DARPA Speech and Natural Language Workshop*, Feb. 1991.

V. Digalakis, P. Monaco and H. Murveit, "Acoustic Calibration and Search in SRI's Large Vocabulary HMM-based Speech Recognition System," *Proc. IEEE ASR Workshop*, Snowbird, Dec. 1993.

K. F. Lee and H. W. Hon, "Speaker Independent Phone Recognition Using Hidden Markov Models," *IEEE Trans. ASSP*, pp. 1641–1648, 1989.

D. Pallet, J. G. Fiscus, W. M. Fisher, and J, S. Garofolo, "Benchmark Tests for the DARPA Spoken Language Program," *HLT Workshop*, Princeton, March 1993.

The Rabiner paper is a survey article on Hidden Markov Model applications to speech recognition which is background for understanding the present invention. It is incorporated herein by reference.

The remaining patents and publications describe other work in the general field.

Bahl et al. '156 describes IBM work on apparatus and method for training the statistics of a Markov model speech recognizer to a subsequent speaker. Therein, the method determines label output probabilities at transitions in the Markov models corresponding to the subsequent speaker where there is sparse training data.

Standard training and recognition algorithms for hidden Markov models are described in J. K. Baker, "Stochastic Modeling as a Means of Automatic Speech Recognition," PhD Thesis Carnegie-Mellon University Computer Science Department, April 1975, or in Levinson et al., "An Introduction to the Application of the Theory of Probabilistic Functions on a Markov Process to Automatic Speech Recognition," *Bell Sys. Tech. Journal*, Vol. 62(4). April 1983.

Levinson et al. describes AT&T Bell Labs work on a speech recognizer which includes a plurality of stored constrained hidden Markov model reference templates and a set of stored signals representative of prescribed acoustic features of the plurality of reference patterns.

Juang et al. describes further AT&T Bell Labs work on a hidden Markov model speech recognition arrangement. Markov model speech pattern templates are formed by analyzing identified speech patterns to generate frame sequences of acoustic feature signals.

Bahl et al. '036 describes IBM work in a speech recognition system whereby discrimination between similar sounding uttered words is improved by weighting the probability vector data stored for the Markov model representing the reference word sequence of phones. The weighting vector is derived for each reference word by comparing similar sounding utterances using Viterbi alignment and multivariate analysis which maximizes the differences between correct and incorrect recognition multivariate distributions.

Partially-tied Gaussian mixtures are discussed in Lee 90 and Haeb-Umbach 92. In those references, only HMM states that belong to allophones (instances of the same phone in different contexts) of the same phone share the same mixture components. However, these phonetically-tied-mixtures (PTMs) did not improve recognition performance significantly.

SUMMARY OF THE INVENTION

In accordance with the invention, a speech recognizer is provided that uses a computationally-feasible method for constructing a set of Hidden Markov Models (HMMs) for speech recognition where the HMMs utilize a partial and optimal degree of mixture tying. With partially-tied HMMs, improved recognition accuracy over systems that use fully-tied HMM of a large vocabulary word corpus is achieved with less computational overhead than systems that use fully untied HMMs. The computationally-feasible technique comprises the steps of determining a cluster of HMM states that share Gaussian mixtures which are close together, developing a subset codebook for those clusters, and recalculating the Gaussians in the codebook to best represent the clustered states.

The invention will be better understood upon reference to the following detailed description, taken in conjunction with the accompanying drawings.

DESCRIPTION OF THE PREFERRED EMBODIMENT

An understanding of the present invention will be facilitated by a review of the task and art of automatic speech recognition by computers.

Figure 1:
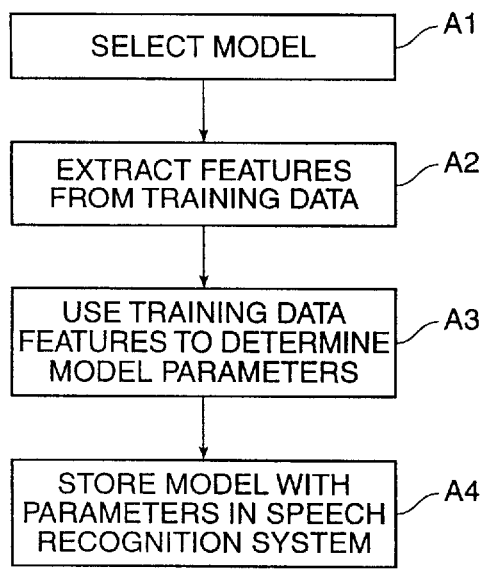
FIG. 1 is a flow chart of the known prior art steps in designing a speech recognition system.

FIG. 1 outlines the common prior art steps utilized in designing a speech recognition system. The first task of a system designer is to select a model that will be used in the computer to represent speech sounds and words (Step A1). Selecting a model involves determining what subunits of speech the system will attempt to process and recognize and involves determining an algorithm for matching a physical speech signal with modelled subunits. A common subunit for recognition is the phone. In one known speech recognition system, the English language is modelled as consisting of 40 phones. For example, one pronunciation of the word "water" might be represented by the four phones w, ao, t, and axr.

Detecting particular phones in a given speech signal is a complex task because styles of speech vary widely between speakers and even for the same speaker at different times. Generally, some form of probability analysis is done on a speech signal to determine the best match between the actual signal data and what the speech recognition system knows about how a phone may be pronounced. A common method for matching an input speech to phones uses Hidden Markov Models (HMMs). One HMM speech recognition system constructs, for each phone, a three-state directed HMM (shown in FIG. 2).

Once a model is selected, the next step in the building of a speech recognition system is to extract features from a set of training data for use in training the model. Feature extraction from speech data is a process used both in training the HMMs and using the HMMs to recognize words in a speech signal. The feature extraction process takes speech input, temporally divides the speech input into frames (in one known system the frames have a duration of 10 ms), and produces a string of feature vectors (directional numbers) for each frame as output.

Training the model (Step A3) consists of using the features from the training data to determine optimal model parameters. The training data typically consists of recorded speech data from a number of different speakers speaking a known speech sample. Once feature data has been extracted from the collected speech data, an algorithm is used to determine parameters for the HMM for each phone. The algorithm selects the parameters for the HMM of a particular phone in order to provide a best match between the features and state transitions predicted by the model and those observed in the training data.

Once the parameters for each HMM have been determined, the trained HMMs, with their parameters, are stored in the speech recognition system (Step S4). The recognition system is then ready to process an unknown speech signal and determine the most likely words spoken.

The present invention is concerned primarily with the training and storing step and involves an improved method and apparatus for developing HMMs and HMM parameters as optimally-tied Gaussian mixtures.

Figure 2:
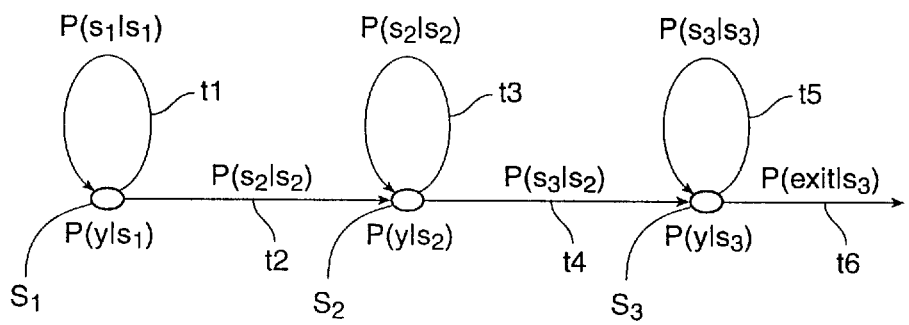
FIG. 2 is a diagram of an HMM for a single phone.

FIG. 2 depicts one type of three-state HMM for a single phone, such as the phone "ao" representing the first vowel sound in the word "water." The three states, $s_1$, $s_2$, and $s_3$, are associated with a collection of features that might be detected during a given frame. Associated with each transition between states is a probability of taking that transition between frames. This probability is not set at the time the model is selected, but it is determined in the training step using actual speech data. The transition probability distributions implicitly model varying durations possible in different parts of speech due to different speech rates or different pronunciations.

Associated with each of the three possible HMM states is a probability function $P(y|s_1)$, $P(y|s_2)$, $P(y|s_3)$ that gives the probability that an observed feature set y was generated by a speech signal in that respective state. As an example, the function $P(y|s_1)$ provides the probability $P_{s_1}$ that a given frame of speech represented by feature set y is in state $s_1$. The HMM further includes six transitions t1–6, with associated probability functions $P(s_1|s_1)$, $P(s_2|s_1)$, $P(s_2|s_2)$, $P(s_2|S_3)$, $P(s_3|s_3)$, $P(s_3|S_{exit})$. According to the model, a transition occurs at every frame boundary and the aforementioned transition probability functions determine the probability that a particular transition will be taken given that the system is in the particular state.

As part of the task of selecting a model for a speech recognition system, the system designer determines the form of the probability equations $P(y|s_1)$, $P(y|s_2)$, $P(y|s_3)$. A speech recognition system built according to the invention uses a new and improved method for developing the probability functions used in the HMMs for the phones and for storing those HMMs for use during speech recognition.

Figure 3:
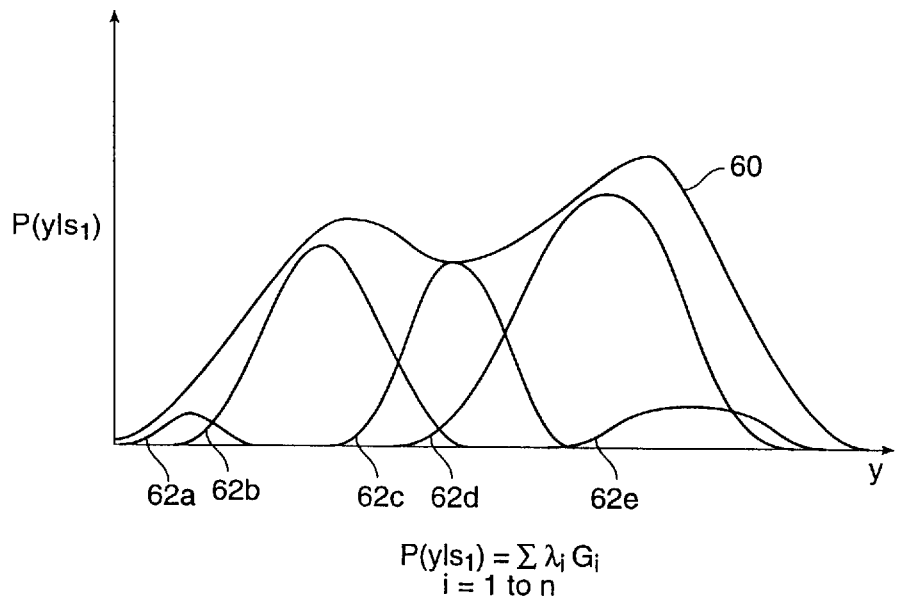
FIG. 3 is a diagram illustrating a method for fitting a mixture of Gaussian curves to the observed feature data of one state of a phone.

The task of determining a probability function for a given HMM state, such as $P(y|s_1)$ is illustrated in FIG. 3. Curve 60 represents $P(y|s_1)$ as determined from the observed training feature data. The speech recognition system designer wishes to develop a probability function for $P(y|s_1)$ that, given a feature set y, will produce a probability that the system is in the state $s_1$. This probability function must "fit" the observed data 60. It has been found in existing speech recognition systems that the training data may be represented by a sum of weighted Gaussian probability functions, shown as curves 62a–e. This weighted Gaussian sum is referred to in the art as a "Gaussian mixture." If each Gaussian curve, 62a–e, is represented by a weighted Gaussian function $\lambda_i G_i(y)$, then the probability $P(y|s_1)$ may be represented by the function:

$$(1) P(Y|s) = \Sigma \lambda_i G_i(y)$$

where s represents the HMM state, y the observed features at a given frame t, $G_i(y)$ a series of Gaussian curves, and $\lambda_i$ a series of weighting constants.

If the speech recognition system designer selects a model using a probability function in form of equation (1), the task of the training algorithm is to determine a set of Gaussian curves $G_i$ and weighting factors $\lambda_i$ that best fit the observed training data for each HMM state. Once the Gaussian curves and weighting factors are determined, they are stored for use in recognition.

One characteristic that distinguishes prior art recognizers is the extent to which the stored Gaussian curves 62a–e are shared between different HMM states. In a fully continuous HMM system using Gaussian mixtures, there is no sharing. A different set of Gaussian curves is estimated and stored for each different HMM state.

Other systems used tied-Gaussian-mixtures to approximate the probability density of each state. In such a system, the same set of Gaussian curves is used for more than one HMM state in the system and only the weighting coefficients, $\lambda_i$, are modified for each HMM state. Where the same Gaussian curves are used for all the HMM states in the system, the system is referred to in the art as a fully-tied-Gaussian-mixture system. In one typical fully-tied system, the training algorithm computes 250 Gaussians for estimating the HMM probability densities, and 250 $\lambda_i$ coefficients are determined and stored for each HMM state. The term "codebook" is used in the art to denote the set $G_i$ of Gaussian curves used to approximate the HMM states in a tied-mixture system.

The relative performance of fully-tied-mixture and fully continuous HMMs depends on the particular task and the amount of the available training data. Fully continuous systems typically need larger amounts of training data and larger amounts of memory in the system to store the Gaussian curves for each state. As a consequence, with small to moderate amounts of training data, tied-mixture HMMs can be shown to outperform fully continuous ones, but with larger amounts of training data and appropriate smoothing, fully continuous HMMs perform better.

According to the present invention, a speech recognizer uses a method for developing and storing HMM state probability functions that is in between fully-tied and fully-continuous HMMs. Only one other point in the spectrum between fully continuous and fully-tied-mixture HMMs has been examined in the prior art (See Lee 90 and Haeb-Umbach 92). In those references, only HMM states that belong to allophones of the same phone share the same mixture components. In these prior art systems, the number of codebooks equals the number of phones in the system and all allophones of a phone and all states of that phone shared the same codebook. However, these phonetically-tied-mixtures did not improve recognition performance significantly in previous work.

Prior art tied-mixtures achieve robust estimation and efficient computation of the density likelihoods in some recognizers. However, the typical codebook size used in prior art systems is small and does not provide a good representation of the acoustic space. According to the present invention, resolution is improved by increasing the number of codebooks used in the system and reducing the degree of tying. The invention follows the approach of simultaneously reducing the codebook size and increasing the number of different codebooks. The invention, therefore, reduces the degree of tying, and the two changes can be balanced so that the total number of component densities in the system is effectively increased and the resolution is improved.

In the invention, performance is optimized by using an automatic procedure to identify subsets of HMM states that can more effectively share mixture components. The invention follows a bootstrap approach from a system that has a higher degree of mixture-tying, such as a fully-tied mixture system, and progressively unties the mixtures.

Figure 4:
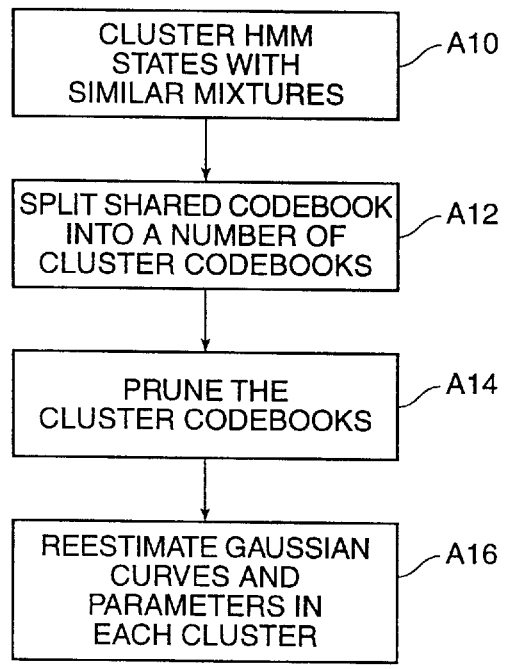
FIG. 4 is a flow chart of a method for generating partially-tied Gaussian mixtures according to the invention.

FIG. 4 is a flowchart of a method for developing partially-tied Gaussian mixtures from a fully-tied Gaussian system. First, the HMM states of all phones are clustered following an agglomerative agglomerative heirarchical clustering procedure (Step A10). The clustering is based on the weighted-by-counts entropy of the mixture-weight distributions disclosed in M. F. Lee 1990. The clustering procedure partitions the set of HMM states S into disjoint sets or clusters $C_i$ of states.

Once the states are grouped into clusters, the clusters are split and an individual codebook is created for each cluster $C_i$ (Step A12). The same codebook will be used for all HMM states belonging to a particular cluster. The cluster codebooks are then pruned (Step A14) to reduce the number of entries in each of the individual codebooks. In the pruning step, those Gaussian curves that are the smallest component of the states in the cluster are removed from the codebook. These pruned codebooks are now used as seed codebooks for the next phase.

Once the separate codebooks have been developed for each cluster, estimation of the probability functions for the states in that cluster may be improved by re-estimating the parameters and Gausian functions looking at just the states in one cluster (Step A16). In one specific embodiment, the parameters are re-estimated using the Baum-Welch algorithm. This step allows the cluster codebooks to deviate from the initial values in the master codebook and achieve a better approximation of the probability distributions.

Figure 5A:
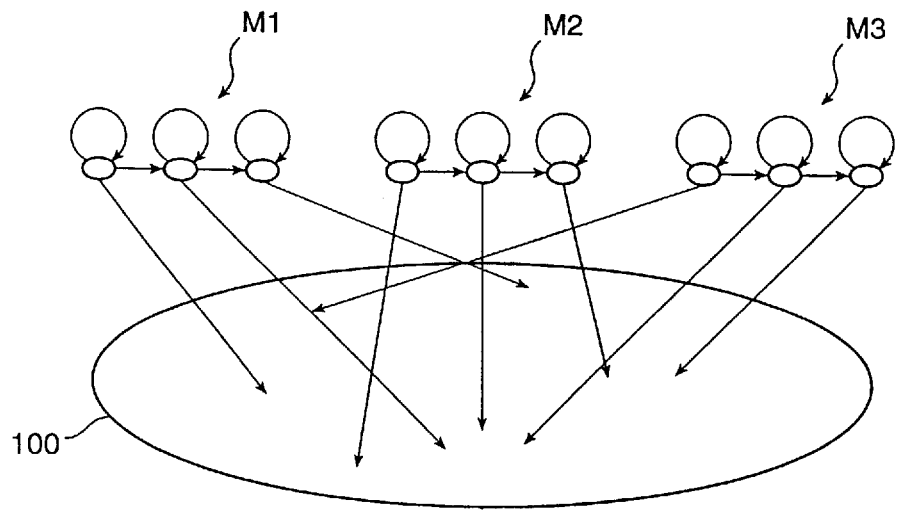
FIGS. 5A–D illustrate clustering, splitting, and reestimation of probability functions representing HMM states according to one embodiment of the invention.
Figure 5B:
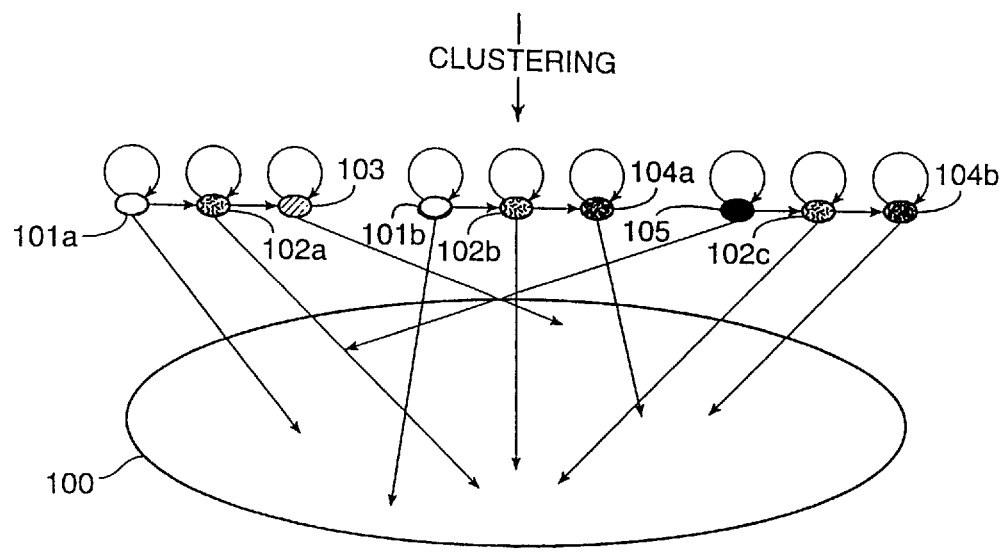

The above described procedure is depicted graphically in FIG. 5A and 5B. FIG. 5A shows a representation of three three-state HMMs, M1, M2, and M3. Each state of the HMMs is associated with a Gaussian mixture, which is a weighted mixture taken from a master codebook for the system. The master codebook is represented by the oval 100 with points in the oval representing different Gaussian curves that comprise the mixtures for the HMM states. In the fully-tied HMM system discussed above using 250 Gaussian curves, each state could be represented by 250 differently weighted arrows pointing to 250 different points in oval 100. In FIGS. 5A–D, the one arrow shown pointing from each state into oval 100 represents the average of those 250 different arrows or weighting factors. In other words, the Gaussian curves in the general area where the arrow for a particular HMM state is pointing are the largest components of that state's Gaussian mixture.

In the clustering step, illustrated in FIG. 5B, HMM states that share similar groups of Gaussian curves in their Gaussian mixture are identified and grouped into clusters. The grouped states are represented by the reference numerals 101a–b, 102a–c, 103, 104a–b, and 105.

Figure 5C:
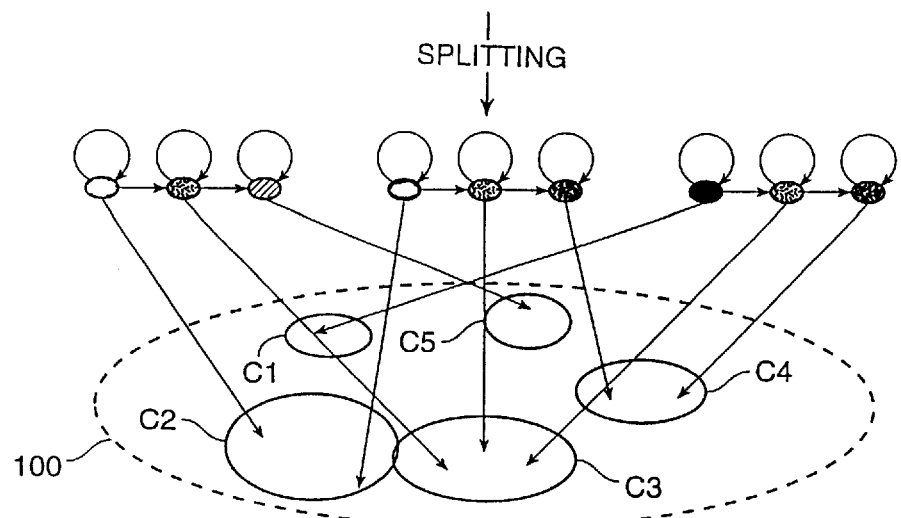

In the splitting and pruning steps, illustrated in FIG. 5C, new codebooks containing a subset of the Gaussians in the master codebook are created for each cluster, and the number of Gaussians stored in each cluster is reduced by selecting only those Gaussians that are the heaviest factor for the probability functions for the states in that cluster and discarding the rest.

Figure 5D:
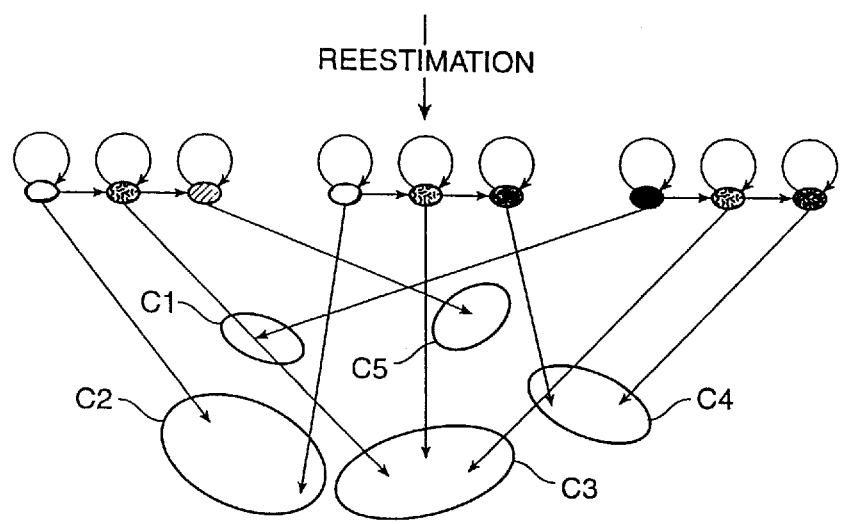

In the re-estimation step illustrated in FIG. 5D, the cluster codebooks are made independent of one another by a process of re-estimation whereby the Gaussians in each are re-estimated to best fit just the probability functions associated with the states in that cluster. These independent cluster codebook are referred to herein as "genones."

Re-estimation of the parameters can be achieved using the standard Baum-Welch re-estimation formulas, since tying does not alter their form, as pointed out in Young 1992. During recognition, and in order to reduce the large amount of computation involved in evaluating Gaussian likelihoods, one embodiment of the invention uses the fast computation scheme described in Digalakis 1993 that is based on vector quantization.

Clustering of either phone or subphone units in HMMs has been used in the prior art systems discussed in Paul 1988, Lee 1990, Bahl 1991, Hwang 1992. Each of these systems achieves less performance than the present invention because while mixture-weight clustering of different HMM states can reduce the number of free parameters in the system, it cannot improve the resolution with which the acoustic space is represented. This is because the total number of component densities in the system remains the same. The present invention uses clustering to identify sets of sub-phonetic regions that will share mixture components. The subsequent steps of the method, where the original set of mixture components is split into multiple overlapping codebooks and each one is re-estimated using data from the states belonging to the corresponding cluster, effectively increase the number of distinct densities in the system and provide the desired detail in the resolution of the acoustic space.

According to the invention, the final number of clusters and cluster codebooks in the system is arbitrary. An optimal number of cluster for a particular system can be selected by the system designer, or the training algorithm may determine the number of clusters most optimal for representing a given set of speech data.

EXPERIMENTAL RESULTS

The method according to the invention has been evaluated on the 5,000-word and 64,000-word recognition tasks of the Wall Street Journal (WSJ) corpus using SRI's DECIPHER™ speech recognition system and the progressive-search framework for fast experimentation. With this approach, an initial fast recognition pass creates word lattices for all sentences in the development set. These word lattices are used to constrain the search space in all subsequent experiments.

Our initial development was done using the 5,000-word portion of the database. We used a bigram language model provided by Lincoln Lab. Table 1 compares the performance and the number of free parameters of tied mixtures (TM), phonetically-tied mixtures (PTM) and genonic mixtures (Genones) on a development set that consists of 18 male speakers and 360 sentences. The training data for this experiment included 3,500 sentences from 42 speakers. We can see that systems with a smaller degree of tying outperform the conventional tied mixtures by as much as 25%, and at the same time have a smaller number of free parameters because of the reduction in the codebook size. After optimizing the parameters on our development set, we evaluated the performance of a gender dependent system trained on 7,200 sentences from 84 speakers using the November 1992 ARPA evaluation set (see Table 2). On that set, we can see that the best genonic mixtures, with 495 genones, outperform the phonetically-tied mixtures by 14%.

TABLE 1

| System | # Genones | Gaussians per Genone | Total # Param. | Word Error % |
|---|---|---|---|---|
| TM | 1 | 256 | 5,126K | 14.1 |
| PTM | 40 | 100 | 2,096K | 11.6 |
| Genones | 495 | 48 | 1,530K | 10.6 |

Comparison of various degrees of tying on 5,000-word WSJ development set.

TABLE 2

| System | Sub % | Del % | Ins % | Word Error % |
|---|---|---|---|---|
| SRI Nov 92 | 9.5 | 1.0 | 2.6 | 13.0 |
| PTM | 6.5 | 0.6 | 1.9 | 9.0 |
| Genones | 5.5 | 0.7 | 1.6 | 7.7 |

Recognition results on 5,000-word WSJ November 92 ARPA evaluation set using a bigram language model.

In the following set of experiments we used the 64,000-word portion of the database. A 20,000-word, open-vocabulary language model was used. The training data consisted of 37,000 sentences from 280 speakers, and gender-dependent models were built. The male subset of the 20,000-word November 1992 evaluation set was used, with a bigram language model. A somewhat surprising result is shown in Table 3. The first row shows the recognition performance of a system that models the six static and dynamic spectral and energy features used in DECIPHER™ as independent observation streams. The second row shows the performance of a system that models the six features in a single stream. We can see that the performance of the two systems is similar. In the past, it was shown that modeling features using independent streams performed significantly better (see K. F. Lee 1989). However, this result was based on discrete-density HMMs. In our case, the small amount of tying provides a fine representation of the acoustic space that makes it unnecessary to improve the resolution accuracy by "quantizing" each feature separately and taking the outer product. In all subsequent experiments we modeled all features using a single observation stream.

TABLE 3

| System | Sub % | Del % | Ins % | Word Error % |
|---|---|---|---|---|
| 6 streams | 9.0 | 0.8 | 2.5 | 12.3 |
| 1 stream | 8.7 | 0.8 | 2.3 | 11.8 |

Comparison of modeling using 6 versus 1 observation streams for 6 underlying features on the male subset of 20,000-word WSJ November 92 evaluation set with bigram language model.

Table 4 compares various degrees of tying by varying the number of genones used in the system. We can see that, because of the larger amount of available training data, the improvement in performance of genonic systems over PTM systems is much larger (20%) than in our 5,000-word experiments. Moreover, the best performance is achieved for a larger number of genones —1,700 instead of the 495 used in the 5,000-word experiments.

TABLE 4

|  | PTM | Genonic HMMs | | | |
|---|---|---|---|---|---|
| Number of Genones | 40 | 760 | 1250 | 1700 | 2400 |
| Speaker | Word Error Rate (%) | | | | |
| 440 | 12.3 | 10.1 | 10.7 | 10.5 | 11.7 |
| 443 | 19.0 | 14.6 | 13.2 | 12.2 | 13.0 |
| 446 | 12.0 | 13.2 | 12.6 | 13.1 | 12.0 |
| 447 | 15.2 | 11.5 | 10.9 | 9.9 | 11.2 |
| Average | 14.7 | 12.3 | 11.8 | 11.4 | 12.0 |

Recognition performance on male subset of 20,000-word WSJ November 1992 ARPA evaluation set for various numbers of codebooks using a bigram language model.

In Table 5 we explore the additional degree of freedom that HMMs built according to the invention have over fully continuous HMMs, namely that states mapped to the same cluster-codebook can have different mixture weights. We can see that tying the mixture weights in addition to the Gaussians introduces a significant degradation in recognition performance. This degradation increases when the features are modeled using multiple streams and as the amount of training data and the number of cluster codebooks decrease.

TABLE 5

|  | Number of Genones | Number of Streams | Word Error (%) | |
|---|---|---|---|---|
|  |  |  | Tied | Untied |
| 5K WSJ0 | 495 | 6 | 9.7 | 7.7 |
| 20K WSJ1 | 1,700 | 1 | 12.2 | 11.4 |

Comparison of state-specific vs. genone-specific mixture weights for different recognition tasks.

The same system, with the addition of a feature obtained using a linear discriminant transformation obtained by a procedure similar to that described in Haeb-Umbach, was evaluated on the November 1993 ARPA evaluation set. It achieved word-error rates of 16.5% and 14.5% with a bigram and a trigram language model, respectively.

What is claimed is:

1. In a speech recognition system using a method for recognizing human speech, the method being of the type comprising the steps of:

selecting a model to represent a selected subunit of speech, the model having associated with it a plurality of states and each state having associated with it a probability function, the probability function having undetermined parameters, the probability functions being represented by a mixture of simple probability functions, the simple probability functions being stored in a master codebook;

extracting features from a set of speech training data;

using the features to determine parameters for the probability functions in the model, an, improvement comprising the steps of:

identifying states that are mostly represented by a related set of simple probability functions;

clustering said states that are mostly represented by a related set of simple probability functions into a plurality of clusters;

splitting up the master codebook into a plurality of cluster codebooks, one cluster codebook associated with each one of said clusters;

pruning the cluster codebooks to reduce the number of entries in each said codebook by retaining the simple probability functions that are most used by the states in the cluster and deleting remaining functions; and re-estimating the simple probability functions in each cluster codebook to better fit the states in that cluster and re-estimating the parameters for each state in the cluster.

2. The method according to claim 1 wherein the simple probability functions are Gaussians.

3. The method according to claim 1 wherein the number of said plurality of clusters is an arbitrary number selected based on system resources and desired performance characteristics.

4. The method according to claim 1 wherein all the states in a cluster are states of one phone and its allophones.

5. The method according to claim 1 wherein the states of one phone use different cluster codebooks.

6. The method according to claim 1 wherein the model is a three-state Hidden Markov Model.

7. The method according to claim 1 wherein states are clustered according to an agglomerative hierarchical clustering scheme.

8. In a speech recognition system for responding to signals representative of digital speech, a method for developing models for subsets of speech comprising the steps of:

selecting a multi-state model with state probability functions, said probability functions being of a general form with initially undetermined parameters;

creating an individual instance of a model for each subunit of speech to be processed;

clustering states based on their acoustic similarity;

creating a plurality of cluster codebooks, one codebook for each cluster; said cluster codebooks consisting of probability density functions that are shared by each cluster's states;

estimating the probability densities of each cluster codebook and the parameters of the probability equations in each cluster.

9. The method according to claim 8 wherein the simple probability functions are Gaussians.

10. The method according to claim 8 wherein the number of said clusters is an arbitrary number selected based on system resources and desired performance characteristics.

11. The method according to claim 8 wherein all the states in a cluster are states of one phone and its allophones.

12. The method according to claim 8 wherein the states of one phone use different cluster codebooks.

13. The method according to claim 8 wherein the model is a three-state Hidden Markov Model.

14. The method according to claim 8 wherein states are clustered according to an agglomerative heirarchical clustering scheme.

15. A method for recognizing speech using a computer comprising the steps of:

selecting a multi-state model with state probability functions, said probability functions being of a general form with initially undetermined parameters;

creating an individual instance of a model for each subunit of speech to be processed;

training the models with a training algorithm that determines parameters for the models that best fit a set of features extracted from known speech samples;

clustering states into a predetermined number of clusters of states wherein the states in each said cluster have probability functions that can be well represented by a shared group of simple probability functions;

developing a cluster codebook of simple probability functions for each cluster and storing said cluster codebooks;

storing for each state an identifier for a cluster codebook and an array of weighting factors;

extracting features from a speech sample to be recognized; and using said state probability functions and said cluster codebooks to determine a most probable state sequence for said speech sample.

16. In a speech recognition system for responding to signals representative of digital speech, a method for developing models for subsets of speech comprising the steps of:

selecting a multi-state model with state probability functions, said probability functions being of a general form with initially undetermined parameters;

creating an individual instance of a model for each subunit of speech to be processed;

clustering states based on their acoustic similarities;

creating a plurality of cluster codebooks, one cluster codebook for each cluster; each codebook comprising a group of shared probability functions; and re-estimating the probability densities of each cluster codebook and the parameters of the probability equations for each state in each cluster.

17. A speech recognizer, comprising:

a computer;

storage means;

a set of models for subunits of speech stored in the storage means;

a feature extractor in the computer for extracting feature data capable of being processed by said computer from a speech signal;

training means in the computer for training the models using features from identified samples of speech data and for producing a master codebook of probability density functions for use by the models;

clustering means in the computer for identifying clusters of states that share subsets of the probability density functions in the codebooks;

splitting and pruning means in the computer for producing cluster codebooks by splitting the master codebook into subsets of probability densities shared by clustered states;

re-estimating means for retraining the models for the states in the clusters and for recalculating the probability densities in each cluster codebook;

recognizing means for matching features from unidentified speech data to the models to produce a most likely path through the models where the path defines the most likely subunits and words in the speech data.

* * * * *